United States Patent
Funane

(10) Patent No.: US 9,531,611 B2
(45) Date of Patent: Dec. 27, 2016

(54) DEVICE MANAGEMENT SYSTEM AND METHOD

(71) Applicant: CANON KABUSHIKI KAISHA, Tokyo (JP)

(72) Inventor: Nao Funane, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 63 days.

(21) Appl. No.: 14/049,508

(22) Filed: Oct. 9, 2013

(65) Prior Publication Data

US 2014/0108866 A1    Apr. 17, 2014

(30) Foreign Application Priority Data

Oct. 12, 2012 (JP) ................................. 2012-226533

(51) Int. Cl.
*G06F 11/00* (2006.01)
*H04L 12/26* (2006.01)

(52) U.S. Cl.
CPC ....... *H04L 43/0823* (2013.01); *H04L 43/0817* (2013.01); *H04L 43/045* (2013.01); *H04L 43/106* (2013.01)

(58) Field of Classification Search
CPC ............. H04L 43/0823; H04L 43/0817; H04L 43/045; H04L 43/106; G06F 11/0778; G06F 11/079; G06F 11/3648; G06F 11/3466
USPC ............................................ 714/37; 709/224
See application file for complete search history.

(56) References Cited

U.S. PATENT DOCUMENTS

| | | | | |
|---|---|---|---|---|
| 8,855,071 | B1* | 10/2014 | Sankaran et al. | 370/329 |
| 2007/0082681 | A1* | 4/2007 | Kim | H04W 8/10 455/456.1 |
| 2009/0176511 | A1* | 7/2009 | Morrison | 455/456.3 |
| 2009/0254658 | A1* | 10/2009 | Kamikura et al. | 709/225 |
| 2009/0300182 | A1* | 12/2009 | Ueno | H04L 67/24 709/226 |
| 2010/0325493 | A1* | 12/2010 | Morimura | G06F 11/0709 714/39 |
| 2014/0003424 | A1* | 1/2014 | Matsuhira | 370/389 |
| 2014/0086081 | A1* | 3/2014 | Mack et al. | 370/252 |

FOREIGN PATENT DOCUMENTS

| | | |
|---|---|---|
| JP | 2000-305886 A | 11/2000 |
| JP | 2004-094919 A | 3/2004 |
| JP | 2010-231375 A | 10/2010 |

* cited by examiner

*Primary Examiner* — Yair Leibovich
(74) *Attorney, Agent, or Firm* — Canon USA, Inc. I.P. Division

(57) ABSTRACT

A device management apparatus in a device management system storing and managing first client information on a client and a device installed in a client network of the client, acquires incident data from a incident management apparatus in a incident management system which is in accordance with second client information different from the first client information, and identifies, from the first client information, a client corresponding to the incident data based on identification information of a target device (i.e., a device ID) included in the incident data.

16 Claims, 10 Drawing Sheets

FIG.3

| CLIENT INFORMATION MANAGED IN DEVICE MANAGEMENT APPARATUS *301* | CLIENT INFORMATION MANAGED IN INCIDENT MANAGEMENT APPARATUS *302* |
|---|---|
| CLIENT A | CLIENT 1 |
| CLIENT B | CLIENT 1 |
| CLIENT C | CLIENT 2 |
| | CLIENT 3 |
| CLIENT D | CLIENT 4 |

FIG.5

| 501 INCIDENT No. | 502 CLIENT ID | 503 DEVICE ID | 504 NOTIFICATION DATE AND TIME | 505 DISPATCH DATE AND TIME | 506 TYPE | 507 CONTENT | 508 INSTALL LOCATION | 509 NOTIFYING PERSON | 510 SERVICE PERSONNEL |
|---|---|---|---|---|---|---|---|---|---|
| 1000 | CLIENT 1 | DevD100 | 2012/6/5 13:10:00 | 2012/6/5 15:00:00 | ERROR | JAM (OCCURRENCE LOCATION: J1) | OFFICE A 3F | J | X |
| 1001 | CLIENT 1 | | 2012/6/5 15:10:00 | 2012/6/5 18:00:00 | ERROR | LOW TONER (CYAN), LOW TONER (MAGENTA) | OFFICE A 3F | J | |
| 1002 | CLIENT 3 | | 2012/6/5 14:00:00 | 2012/6/5 17:00:00 | ORDER | A4 SHEET | OFFICE C 2F | K | Y |
| 1003 | CLIENT 4 | DevD400 | 2012/6/5 16:00:00 | 2012/6/5 19:00:00 | ERROR | LOW TONER (CYAN) | | K | Y |
| 1004 | CLIENT 1 | | — | 2012/6/15 10:00:00 | REGULAR MAINTENANCE | REGULAR MAINTENANCE | OFFICE A 3F | — | X |
| 1005 | CLIENT 1 | | 2012/6/15 10:00:01 | 2012/6/15 13:00:00 | ERROR | JAM (OCCURRENCE LOCATION: J1) | | J | X |

FIG.7

| ERROR No. | DEVICE ID | ERROR OCCURRENCE DATE AND TIME | ERROR INFORMATION | CORRESPONDING INCIDENT No. |
|---|---|---|---|---|
| 6000 | DevD100 | 2012/6/5 13:00:00 | JAM (OCCURRENCE LOCATION: J1) | 1000 |
| 6001 | DevD102 | 2012/6/5 15:00:00 | LOW TONER (CYAN), LOW TONER (MAGENTA) | |
| 6002 | DevD200 | 2012/6/5 14:00:00 | A4 SHEET RUN-OUT | |

701 702 703 704 705

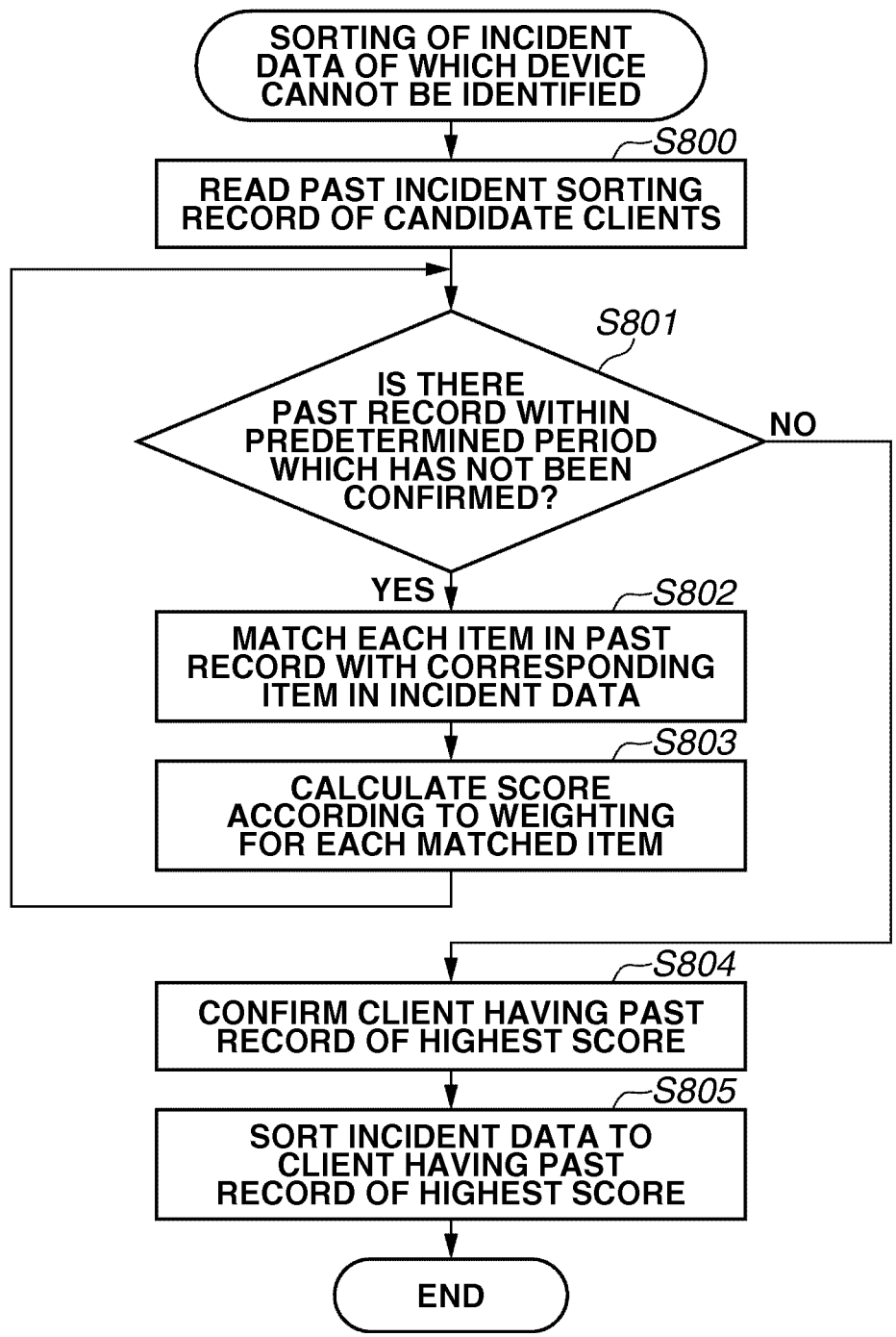

FIG.9A

| INCIDENT No. 501 | CLIENT ID 502 | DEVICE ID 503 | NOTIFICATION DATE AND TIME 504 | DISPATCH DATE AND TIME 505 | TYPE 506 | CONTENT 507 | INSTALL LOCATION 508 | NOTIFYING PERSON 509 | SERVICE PERSONNEL 510 | CLIENT TO WHICH INCIDENT IS SORTED 511 |
|---|---|---|---|---|---|---|---|---|---|---|
| 999 | CLIENT 1 | DevD100 | 2012/5/20 13:00:00 | 2012/5/20 15:00:00 | ERROR | JAM (OCCURRENCE LOCATION: J1) | OFFICE A 3F | J | Y | CLIENT A |
| 998 | CLIENT 1 | DevD999 | 2012/5/19 14:00:00 | 2012/5/19 19:00:00 | ORDER | A4 SHEET |  | K | X | CLIENT B |
| 997 | CLIENT 1 |  | 2012/5/18 15:00:00 | 2012/5/18 18:00:00 | ERROR | LOW TONER (CYAN) | OFFICE B 2F | K | Y | CLIENT B |

FIG.9B

| INCIDENT No. 501 | CLIENT ID 502 | DEVICE ID 503 | NOTIFICATION DATE AND TIME 504 | DISPATCH DATE AND TIME 505 | TYPE 506 | CONTENT 507 | INSTALL LOCATION 508 | NOTIFYING PERSON 509 | SERVICE PERSONNEL 510 | CLIENT TO WHICH INCIDENT IS SORTED 511 |
|---|---|---|---|---|---|---|---|---|---|---|
| 996 | CLIENT 2 | DevD200 | 2012/5/18 13:00:00 | 2012/5/18 15:00:00 | ERROR | JAM (OCCURRENCE LOCATION: J2) |  | L | Z | CLIENT C |
| 995 | CLIENT 1 |  | — | 2012/5/15 10:00:00 | REGULAR MAINTENANCE | REGULAR MAINTENANCE | OFFICE A 3F | I | X | CLIENT A |
| 994 | CLIENT 1 | DevD100 | 2012/5/10 13:00:00 | 2012/5/10 15:00:00 | ERROR | JAM (OCCURRENCE LOCATION: J1) | OFFICE A 3F | J | Y | CLIENT A |
| 993 | CLIENT 1 | DevD100 | 2012/5/8 13:00:00 | 2012/5/8 15:00:00 | ERROR | JAM (OCCURRENCE LOCATION: J1) | OFFICE A 3F | M | Y | CLIENT A |
| ... | ... |  | ... | ... | ... | ... | ... | ... | ... | ... |
| 920 | CLIENT 1 |  | — | 2012/4/15 10:00:00 | REGULAR MAINTENANCE | REGULAR MAINTENANCE | OFFICE A 3F | I | X | CLIENT A |

DEVICE MANAGEMENT SYSTEM AND METHOD

BACKGROUND OF THE INVENTION

Field of the Invention

The present invention relates to a technique for managing a network device on a network.

Description of the Related Art

Generally, there is a system in which, if an error occurs in a network device (hereinafter referred to as a device), a client (a customer user) contacts a service center. The device may be a camera or an image forming apparatus such as a single function peripheral (SFP) or a multifunction peripheral (MFP). A service personnel is then dispatched to a location of the client to fix the device. Contents of a notification from the client include service requests such as an order for consumables, e.g., toner and sheets, an inquiry on an operation method, and an inquiry on a forgotten password, in addition to occurrence of the error (i.e., a failure). Such notification from the client to the service center is managed as an incident.

The incident indicates an event not included in a standard operation of a service which cause or may cause interruption of the service, or degradation of service quality. In other words, an incident indicates a state in which the client cannot use the above-described device during a period in which the device can be used at an original level of quality.

Incident data in which the incident is recorded includes device identification (ID) for identifying the device in which the error has occurred, and the content of the error.

On the other hand, there is a device management system which generates and provides a report on a usage of the device for advising the client of the device on replacing, newly purchasing, and a method for using the device. Such a report includes the incident and counter information to provide the client with the information on the usage of the device.

The incident is taken in the report by acquiring the incident data from an incident management system managed by the service center.

Further, the counter information is taken in the report by the device management system communicating with the device and acquiring the counter information.

Japanese Patent Application Laid-Open No. 2004-094919 discusses a method in which the device management system obtains the counter information from the device and manages it. More specifically, the device management system uniquely identifies the device using the device ID (e.g., an internet protocol (IP) address or a media access control (MAC) address).

The above-described device management system and the incident management system then cooperate with each other. As a result, the device management system can generate and provide to the client an overall device usage report.

However, the device management system is managed by a device sales company, while the incident management system is managed by the service center, so that a managing source of each system is sometimes different. In such a case, contracting units (i.e., management units) of the clients managed by each system may be different.

For example, the device sales company may manage a head office and a branch office of company Z as separate client tenants (i.e., client A and client B). On the other hand, the service center may collectively manage the head office and the branch office of company Z as one client (i.e., client 1).

In such a case, the device management system cannot determine whether to sort the incident data of "client 1" acquired from the incident management system to "client A" or "client B" in the device management system.

If the device management system stores the information on the devices of each client tenant, the device management system can compare the information on the devices with the device ID included in the incident data. The device management system can thus identify the client tenant for sorting the incident data thereto.

However, the incident data may be manually input, and may not include all of the correct information.

Japanese Patent Application Laid-Open No. 2004-094919 discusses a technique for identifying the device using the device ID with respect to the counter information. However, there is a case where the incident data may not include the information by which the device is identifiable as described above, so that the client tenant to which the incident data is to be sorted cannot be identified.

SUMMARY OF THE INVENTION

The present invention is directed to a method capable of sorting the incident to an appropriate client and providing an optimal report to the client, even when the information in the incident data acquired from the incident management system is insufficient.

According to an aspect of the present invention, a device management system includes a management unit configured to store and manage first client information on a client and a device installed in a network of the client, an acquisition unit configured to acquire incident data from an incident management system which is in accordance with second client information different from the first client information, and an identification unit configured to identify, based on identification information of a target device included in the incident data, a client corresponding to the incident data from the first client information.

Further features of the present invention will become apparent from the following description of exemplary embodiments with reference to the attached drawings.

BRIEF DESCRIPTION OF THE DRAWINGS

FIG. 3 illustrates an example of a client association table which stores information on associating a client managed by the device management apparatus 110 with a client managed by an incident management apparatus 120.

FIG. 7 illustrates an example of an error information table storing error information on each device managed by the device management apparatus 110.

FIG. 8 is a flowchart illustrating an example of a process for sorting, to the client, the incident data of which the device cannot be identified according to a second exemplary embodiment.

FIGS. 9A and 9B illustrate examples of a table storing past incident sorting results.

DESCRIPTION OF THE EMBODIMENTS

Various exemplary embodiments, features, and aspects of the invention will be described in detail below with reference to the drawings.

Figure 1A:
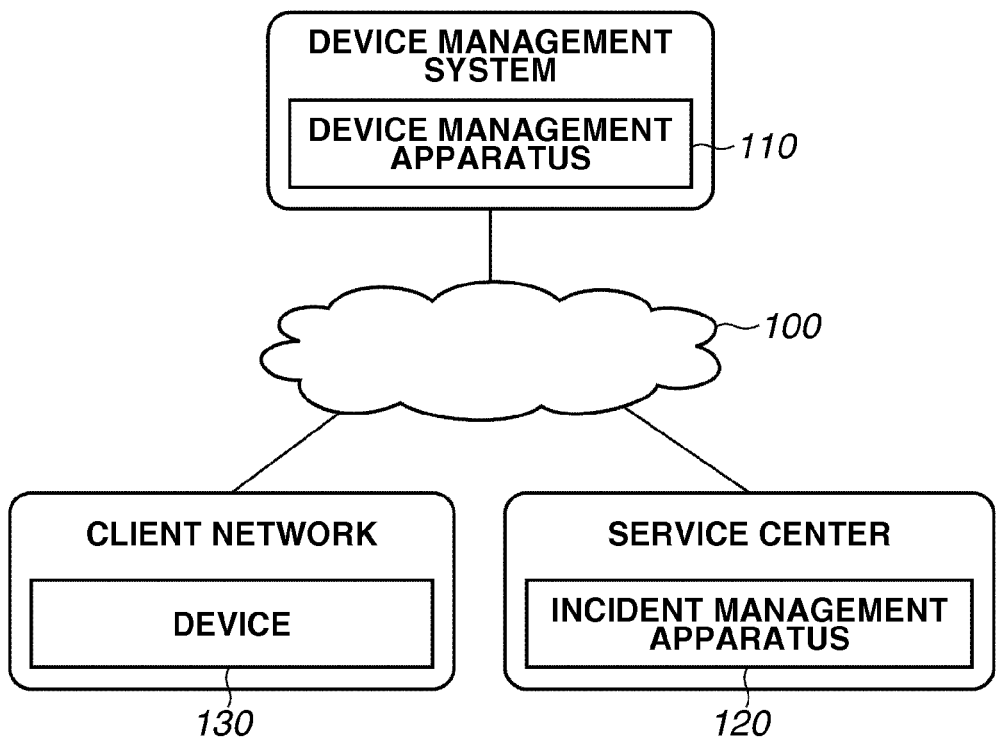
FIGS. 1A and 1B illustrate examples of a system to which a device management system according to an exemplary embodiment of the present invention is applicable.

FIG. 1A illustrates an example of a system to which the device management system according to an exemplary embodiment of the present invention is applicable.

Figure 2:
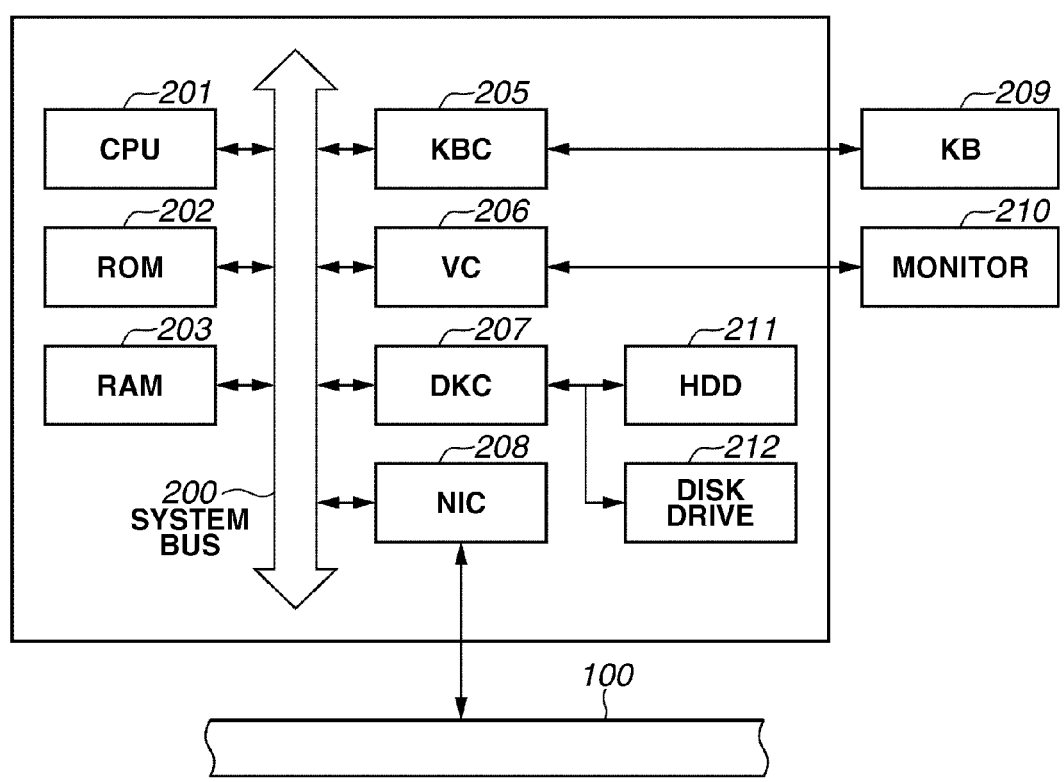
FIG. 2 is a block diagram illustrating an example of a configuration of a device management apparatus 110.

Referring to FIG. 1A, a device management apparatus 110 included in the device management system is a computer having a configuration as illustrated in FIG. 2 to be described below.

The device management apparatus 110 includes a function for connecting to a network 100. Further, the device management apparatus 110 includes a function for communicating via the network 100 with the incident management apparatus 120 and a device 130.

The configuration of the device management apparatus 110 will be described below with reference to FIG. 2.

FIG. 2 is a block diagram illustrating an example of the configuration of the device management apparatus 110.

Referring to FIG. 2, a central processing unit (CPU) 201 executes programs stored in a read-only memory (ROM) 202 and a hard disk drive (HDD) 211, using a random access memory (RAM) 203 as a work memory. The CPU 201 thus controls each component to be described below via a system bus 200.

The HDD 211 stores an operating system (OS), various programs, and various data.

The CPU 201 is capable of accessing the HDD 211 and a disk drive 212 via a disk controller (DKC) 207. The CPU 201 can install in the HDD 211 the various programs recorded to be computer-readable in a recording medium (e.g., a digital versatile disk (DVD)-ROM) set in the disk drive 212.

Further, the CPU 201 is communicable via a network interface card (NIC) 208 with other computers and devices connected to the network 100.

Furthermore, the CPU 201 displays a user interface (UI) on a monitor 210 via a video card (VC) 206 according to the above-described programs. The user operates a keyboard (KB) 209 and a pointing device (not illustrated) such as a mouse to make instructions and inputs to the UI. The CPU 201 receives the user instruction and input via a keyboard controller (KBC) 205, and executes various processes according to the user instruction and input.

The device management system will be described below with reference to FIGS. 1A and 1B.

The incident management apparatus 120 included in the incident management system is a computer having the configuration as illustrated in FIG. 2, similarly as the device management apparatus 110.

The device 130 is an image forming apparatus (i.e., a device) such as a copying machine. The device 130 includes a function for connecting to a network 100. Further, the device 130 includes a function for communicating with the device management apparatus 110 via the network 100.

According to the present exemplary embodiment, the system is realized by cooperating programs on information processing apparatuses such as the device management apparatus 110, the incident management apparatus 120, and the device 130. The programs are stored in a computer-readable manner in a non-volatile storing area in each of the information processing apparatus, read to the RAM, and executed by the CPU.

The device management function of the device management apparatus 110 will be described below.

The device management apparatus 110 includes a function for managing the device 130 in a client network. Only one client network is illustrated in FIG. 1. However, there is a plurality of client networks. Further, there may be a plurality of devices 130 in each client network.

The device management apparatus 110 has a function for storing and managing the information on the client and the devices installed for the client (i.e., the first client information, such as the information illustrated in FIGS. 6 and 7 to be described below). The function of the device management apparatus 110 will be described in detail below.

Figure 6:
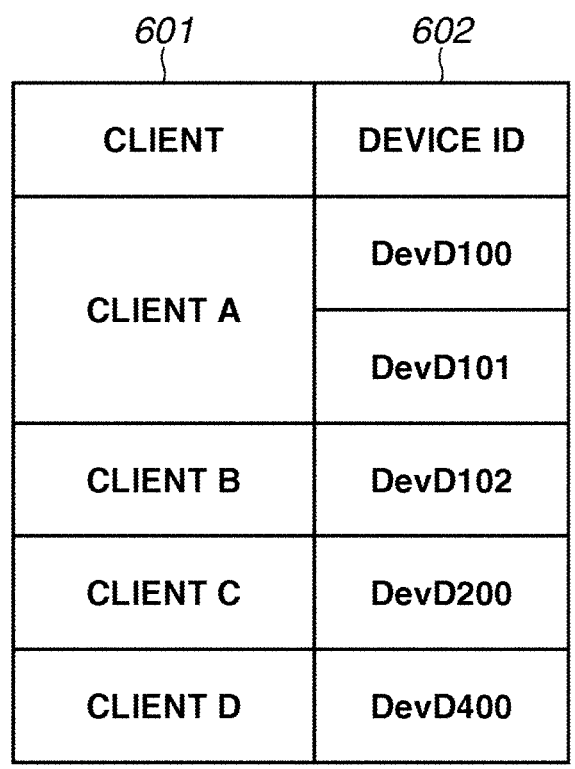
FIG. 6 illustrates an example of a device information table managing device information for each client.

The device management apparatus 110 stores the device information table as illustrated in FIG. 6, and manages the device for each client.

FIG. 6 illustrates an example of the device information table for managing the device information for each client. The device management table illustrated in FIG. 6 is stored in the HDD 211 in the device management apparatus 110.

Referring to FIG. 6, according to the present exemplary embodiment, each of the device information stored in the device table includes information on a "client" 601 and a "device ID" 602.

The "client" 601 is the information for identifying the client by units of the clients managed by the device management apparatus 110. The "device ID" 602 is the device identification information, and may be the IP address, the MAC address, or a serial number of the device.

The device information table illustrated in FIG. 6 manages as the devices used by "client A" managed by the device management apparatus 110, the devices respectively having the device IDs "DevD100" and "DevD101" associated with "client A". Further, the device information table manages the device having the device ID "DevD102" associated with "client B", as the device used by "client B" managed by the device management apparatus 110.

The device management apparatus 110 communicates with the device 130 and obtains an error occurrence status of the device 130. The device management apparatus 110 then stores the acquired error occurrence status in the HDD 211 and displays it on the monitor 210. In such a case, the error information which the device management apparatus 110 obtains from the device 130 includes a "device ID" 702, an "error occurrence date and time" 703, and "error information" 704 as illustrated in FIG. 7 to be described below. The device management apparatus 110 may acquire the error information by the device 130 transmitting the error information to the device management apparatus 110 in response to an acquisition request. Further, the device 130 may transmit the error information to the device management apparatus 110 when an error has occurred in the device 130 or regularly.

The device management apparatus 110 stores the error information table as illustrated in FIG. 7, and stores and manages the error information acquired from the device 130.

FIG. 7 illustrates an example of the error information table storing the error information (i.e., failure information of the device installed for the client) of each device managed by the device management apparatus 110. The error information table illustrated in FIG. 7 is stored in the HDD 211 in the device management apparatus 110.

Referring to FIG. 7, according to the present exemplary embodiment, each of the error information stored in the error information table includes the information such as an "error number (No.)" 701, the "device ID" 702, the "error occurrence date and time" 703, the "error information" 704, and a "corresponding incident No." 705.

The "error No." 701 is a unique number added by the device management apparatus 110 to each of the error information acquired from the device 130.

The "device ID" 702, the "error occurrence date and time" 703, and the "error information" 704 correspond to the error information acquired from the device 130.

More specifically, the "device ID" 702 indicates the device ID of the device 130 in which the error has occurred, and is in common with the "device ID" 602 in the device information table illustrated in FIG. 6. The "error occurrence date and time" 703 indicates the date and time at which the error has occurred in the device 130. The "error information" 704 indicates the content of the error that has occurred. The "corresponding incident No." 705 will be described below.

The incident management function of the incident management apparatus 120 will be described below.

If an error has occurred in the device 130, the client of the device 130 notifies the fact to the service center.

The incident indicates the event not included in the standard operation of the service which cause or may cause interruption of the service, or degradation of the service quality. In other words, according to the present exemplary embodiment, the incident indicates the state in which the client cannot use the device during a period in which the device can be used at the original level of quality. Such incidents include in addition to the occurrence of a failure or a problem, the degradation of performance, the client forgetting the password, and the service requests such as an order for the consumables and confirmation of regular maintenance.

Incident management is a process for promptly solving the state in which the client cannot perform a job using the device, and supporting continuation of the job. The notification on the incident is issued to the service center, i.e., a contact point for all notifications. The service personnel at the service center inputs all incidents notified from the client as the incident data. The incident data is then recorded in the HDD 211 in the incident management apparatus 120.

Figure 5:
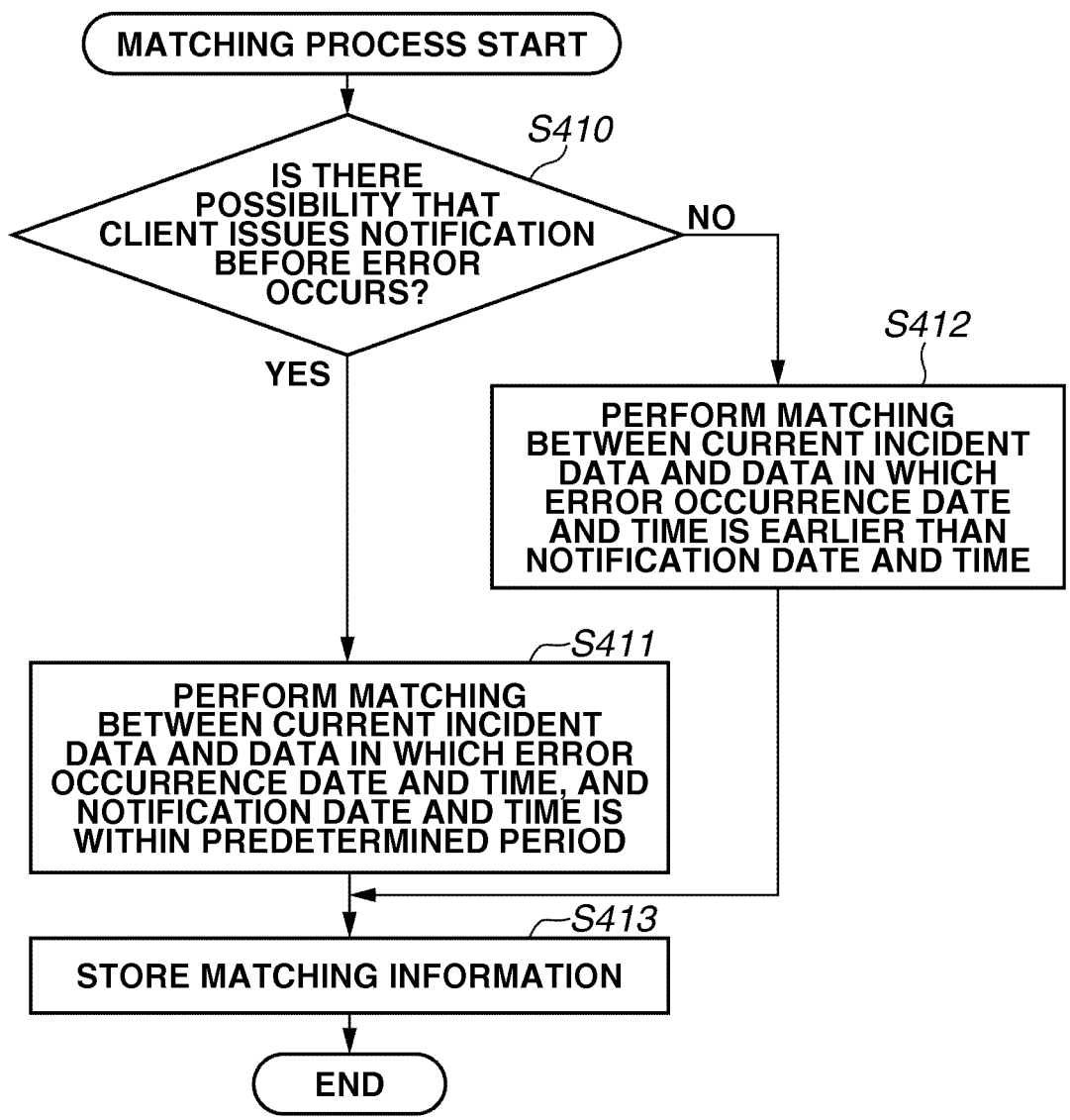
FIG. 5 illustrates an incident data table storing the incident data managed by the incident management apparatus 120.

The incident management apparatus 120 includes the function for storing and managing the incident data. The incident management apparatus 120 stores an incident data table as illustrated in FIG. 5, and stores and manages the incident data of the device 130 in the table. The incident data is in accordance with the second client information which is of a different system from the first client information managed by the device management system.

FIG. 5 illustrates an example of the incident data table storing the incident data managed by the incident management apparatus 120. The incident data table illustrated in FIG. 5 is stored in the HDD 211 in the incident management apparatus 120.

Referring to FIG. 5, according to the present exemplary embodiment, each incident data stored in the incident data table includes an "incident No." 501, a "client ID" 502, a "device ID" 503, a "notification date and time" 504, a "dispatch date and time" 505, a "type" 506, "content" 507, an "install location" 508, a "notifying person" 509, and "service personnel" 510, as the information.

The "incident No." 501 is a unique number for each incident data. The "client ID" 502 is the information for identifying the notifying client (i.e., the identification information of the client for managing the client according to the second client information that is of a different system from the first client information managed by the device management system) by the client units managed by the incident management apparatus 120.

The "device ID" 503 indicates the device ID (i.e., the identification information) of the device (i.e., the target device) in which the incident corresponding to the notification has occurred. The "device ID" 503 is in common with the "device ID" 602 illustrated in FIG. 6 and the "device ID" 702 illustrated in FIG. 7.

The "notification date and time" 504 is the date and time at which the client has issued the notification. The "dispatch date and time" 505 is the date and time at which the service personnel has been dispatched in response to the notification from the client. The "type" 506 indicates the type of the content of the notification, i.e., an error, an order, or regular maintenance. The "content" 507 indicates the concrete content of the notification.

The "install location" 508 indicates the install location of the device in which the incident corresponding to the notification has occurred. The "notifying person" 509 indicates the information for identifying the person who has issued the notification. The "service personnel" 510 indicates the information for identifying the service personnel dispatched in response to the notification.

The above-described incident data is stored in the incident data table.

The incident is simply an event (i.e., a status), and does not include the cause of the incident. In other words, the incident is managed separately from the cause thereof. The incident is managed so that the usage of the device which has been interrupted by the incident is immediately restored, and stagnation of the job is minimized.

The incident data may thus be used to perform the following processes. The increase and decrease in the number of occurrences, a trend in the occurrences, and time required for solving the incident can be analyzed. The device (including related services) can then be evaluated on a provider side and the client side, so that the cause of the occurrence of the incident can be determined, and points to be improved can be identified. Further, improved utilization can be proposed, and product development and services can be improved. To achieve such results, it is necessary to view the incident data as one element in a series of the device management processes, instead of singularly managing the incident.

According to the present exemplary embodiment, the incident management apparatus 120 regularly reads the incident data from the HDD 211 in the incident management apparatus 120, and transmits the read incident data to the device management apparatus 110. Further, the incident management apparatus 120 may read and transmit the incident data to the device management apparatus 110 in response to the request from the device management apparatus 110.

The device management apparatus 110 receives the incident data transmitted from the incident management apparatus 120, and stores it in the HDD 211.

Further, the device management apparatus 110 associates the incident data with (i.e., sorts the incident data to) the client information (e.g., the error information to be described below) managed by the device management apparatus 110. The device management apparatus 110 then generates the device usage report including the incident data by using the associated client information, and provides the report to the client.

More specifically, if the CPU 201 in the device management apparatus 110 has identified the client to which the incident data is to be sorted, the CPU 201 outputs the report for the client by including the incident data in the report. The CPU 201 then provides the output report (i.e., the report including the incident data) to the client.

Management of the device, including providing the report as described above, is thus performed using the incident data as one element. The device and the device-related services can then be evaluated on the provider side and the client side, so that the cause of the occurrence of the error can be determined, and points to be improved can be identified. Further, improved utilization can be proposed, and the product development and the services can be improved. As a result, a customer satisfaction level with respect to the use of the device, and availability of the device can be improved on the client side. Further, job efficiency, reduction in do-over and loss time, and cost reduction can be realized on the client side. Further, summing of the device usage and operation cost, collective management of device settings, and strengthening of job management can be realized on the device provider side. Further, the device provider can provide an appropriate service which matches a client environment, develop new devices and service menus, propose increased efficiency in business and new additional values, and propose an optimal arrangement for realizing further cost reduction.

The device management system is managed by the device sales company, and the incident management system is managed by the service center. Each system may thus be managed by a different source. In such a case, the contracting units of the clients may be different, so that the management units of the clients managed in each system may become different. In other words, the device management apparatus 110 and the incident management apparatus 120 may manage the clients in different units.

To solve such a problem, according to the present exemplary embodiment, the device management apparatus 110 sets the information which associates the client managed therein with the client managed in the incident management apparatus 120. The device management apparatus 110 then stores the information in the table as illustrated in FIG. 3.

FIG. 3 illustrates a client association table storing the information for associating the client managed by the device management apparatus 110 with the client managed by the incident management apparatus 120. The table illustrated in FIG. 3 is stored in the HDD 211 in the device management apparatus 110.

Referring to FIG. 3, according to the present exemplary embodiment, the client association information stored in the client association table associates "client information" 301 managed by the device management apparatus 110 with "client information" 302 managed by the incident management apparatus 120.

In other words, the client association table associates "client" 601 in the device management table illustrated in FIG. 6 with the "client ID" 502 in the incident data table illustrated in FIG. 5.

In the example illustrated in FIG. 3, "client A" and "client B" managed by the device management apparatus 110 are associated with "client 1" managed by the incident management apparatus 120. Further, "client C" managed by the device management apparatus 110 is associated with "client 2" and "client 3" managed by the incident management apparatus 120. Furthermore, "client D" managed by the device management apparatus 110 is associated with "client 4" managed by the incident management apparatus 120.

The device management apparatus 110 acquires the incident data from the incident management apparatus 120, and analyzes the incident data. The device management apparatus 110 then uses the "client ID" 502 in the incident data and sorts the incident data to the corresponding client managed thereby.

For example, if the client ID 502 in the acquired incident data is "client 2" or "client 3", the device management apparatus 110 sorts the incident data to "client C" managed thereby. Further, if the client ID 502 in the acquired incident data is "client 4", the device management apparatus 110 sorts the incident data to "client D" managed thereby.

A case where the "client ID" 502 in the acquired incident data is "client 1" will be described below. As illustrated in FIG. 3, "client A" and "client B" managed by the device management apparatus 110 are associated with "client 1" managed by the incident management apparatus 120. The device management apparatus 110 thus cannot determine whether to sort the incident data in which the "client ID" 502 is "client 1" to "client A" or "client B" managed thereby, based only on the client ID.

The process for sorting the incident data to the clients according to the first exemplary embodiment of the present invention will be described below with reference to FIGS. 4A and 4B.

Figure 4:
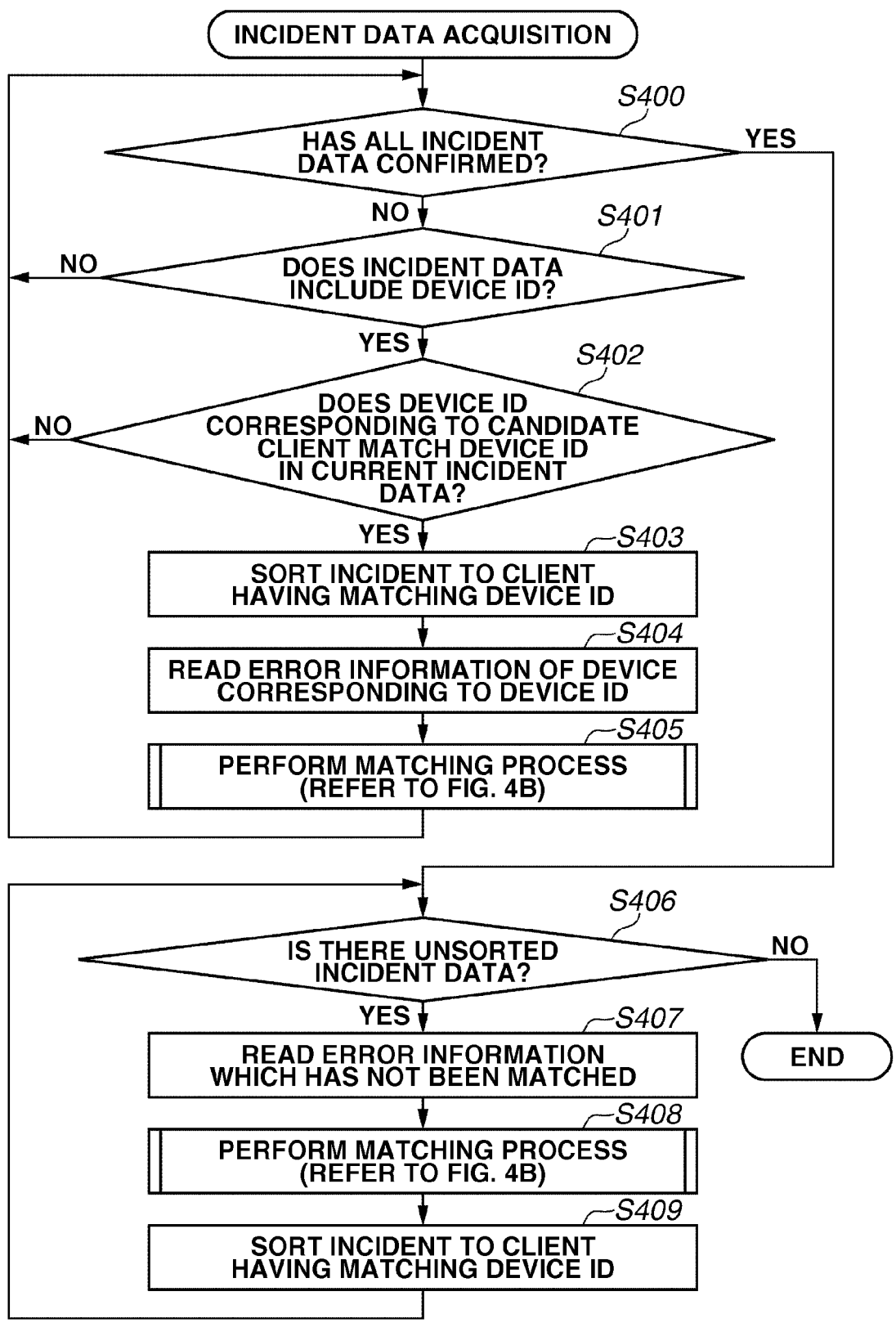
FIGS. 4A and 4B are flowcharts illustrating examples of a process for sorting incident data to clients according to a first exemplary embodiment of the present invention.

FIGS. 4A and 4B are flowcharts illustrating examples of the process for sorting the incident data to the clients according to the first exemplary embodiment. The process illustrated in the flowcharts is realized by the CPU 201 in the device management apparatus 110 reading and executing the program recorded in a computer-readable manner in the HDD 211.

Upon acquiring the incident data from the incident management apparatus 120, the CPU 201 in the device management apparatus 110 starts the process illustrated in FIG. 4A.

In step S400, the CPU 201 in the device management apparatus 110 performs control to execute the processes illustrated in step S401 to step S405 with respect to all of the acquired incident data. In step S401, the CPU 201 in the device management apparatus 110 acquires and analyzes one of unprocessed incident data (hereinafter referred to as current incident data) among the received incident data. The CPU 201 in the device management apparatus 110 then determines whether the current incident data includes the device ID.

For example, if the current incident data is incident No. "1000" illustrated in FIG. 5, "DevD100" is stored in the "device ID" 503. In such a case, the current incident data includes the device ID (YES in step S401). Further, if the current incident data is incident No. "1001" illustrated in FIG. 5, there is no device ID stored in the "device ID" 503. In such a case, the current incident data does not include the device ID (NO in step S401).

If the current incident data does not include the device ID (NO in step S401), the process returns to step S400.

On the other hand, if the current incident data includes the device ID (YES in step S401), the process proceeds to step S402.

In step S402, the CPU 201 in the device management apparatus 110 identifies "client information" 301 managed by the device management apparatus 110 associated with the "client ID" 502 included in the current incident data, as the client to be a candidate (i.e., a candidate client) for association. The "client information" 301 is associated with the "client ID" 502 in the client association table (illustrated in FIG. 3). Further, the CPU 201 in the device management apparatus 110 determines whether there is the "device ID"

602 associated with the candidate client in the device information table illustrated in FIG. 6, which matches the "device ID" 503 included in the current incident data.

If the CPU 201 in the device management apparatus 110 determines that there is no "device ID" 602 of the candidate client which matches the "device ID" 503 included in the current incident data (NO in step S402), the process returns to step S400.

If the CPU 201 in the device management apparatus 110 determines that there is the "device ID" 602 of the candidate client which matches the "device ID" 503 included in the current incident data (YES in step S402), the process proceeds to step S403.

In step S403, the CPU 201 in the device management apparatus 110 determines the incident corresponding to the current incident data as the incident of (i.e., sorts to) the client having the matching device ID determined in step S402. Further, the CPU 201 in the device management apparatus 110 records the current incident data and the information on the client to which the incident is to be sorted in the HDD 211 in the device management apparatus 110 (e.g., in a form of a table as illustrated in FIG. 9A according to a second exemplary embodiment) sort. The process then proceeds to step S404.

In step S404, the CPU 201 in the device management apparatus 110 reads the following information as the candidate error information from the error information table (illustrated in FIG. 7) in the HDD 211 in the device management apparatus 110. More specifically, the CPU 201 reads all of the error information of the device corresponding to the device ID included in the current incident data which is not yet associated with the incident data (i.e., the error information in which there is no data stored in the "corresponding incident No." 705). The process then proceeds to step S405.

In step S405, the CPU 201 in the device management apparatus 110 performs matching between the current incident data and the error information (i.e., the candidate error information) read in step S404 (i.e., performs a matching process illustrated in the flowchart of FIG. 4B). The matching process according to the first exemplary embodiment will be described below with reference to FIG. 4B.

The matching process performed in step S405 and step S408 to be described below will be described in detail with reference to the flowchart illustrated in FIG. 4B.

FIG. 4B is a flowchart illustrating the matching process in detail according to the first exemplary embodiment.

In step S410, the CPU 201 in the device management apparatus 110 determines whether there is a possibility that the client may notify the current incident before a device error occurs. The CPU 201 determines based on the "type" 506 and the "content" 507 of the incident corresponding to the current incident data. The conditions for determining whether there is a possibility that the client may notify the current incident before the device error occurs are preset to the device management apparatus 110. For example, if the "type" 506 is "order" and the "content" 507 is "A4 sheet", the client may notify a paper run-out error before there is the paper run-out error in the device. The CPU 201 thus sets the incident as having the possibility of the client notifying thereof before the device error occurs.

If the CPU 201 in the device management apparatus 110 determines that the client may notify the current incident before the device error occurs (YES in step S410), the process proceeds to step S411.

In step S411, the CPU 201 in the device management apparatus 110 performs matching of the current incident data with respect to the candidate error information as follows. The CPU 201 performs matching with respect to the candidate error information in which a time difference between the "notification date and time" 504 of the current incident data and the "error occurrence date and time" 703 is within a predetermined period. The process then proceeds to step S413. The predetermined period in step S411 may be set for each client.

On the other hand, if the CPU 201 in the device management apparatus 110 determines that there is no possibility that the client may notify the current incident before the device error occurs (NO in step S410), the process proceeds to step S412.

In step S412, the CPU 201 in the device management apparatus 110 performs matching between the current incident data and the candidate error information in which the "error occurrence date and time" 703 is earlier than the "notification date and time" 504 of the current incident data. The process then proceeds to step 413.

In step S413, the CPU 201 in the device management apparatus 110 stores the matching information (i.e., correspondence information between the incident data and the error information) matched in step S411 or step S412. The CPU 201 thus stores a value of the "incident No." 501 included in the current incident data in the corresponding "incident No." 705 in the error information matched with the current incident data. The CPU 201 then stores the matching information in the HDD 211 in the device management apparatus 110.

As described above, time information (i.e., the "notification date and time" 504) included in the incident data and the time information (i.e., the "error occurrence date and time" 703) included in the error information are compared in the matching process illustrated in FIG. 4B to extract the matched error information. The comparison is performed using the comparison condition (i.e., as in step S411 or step S412) according to the content of the incident data (i.e., the "type" 506 and the "content" 507). The matching process is thus performed. The process then returns to the process illustrated in FIG. 4A.

The process illustrated in the flowchart of FIG. 4A will be described below.

Upon completing the process of step S405, the process returns to step S400.

In step S400, the CPU 201 in the device management apparatus 110 determines whether the processes of step S401 to step S405 have been performed with respect to all of the acquired incident data. If the processes have been performed with respect to all of the acquired incident data (YES in step S400), the process proceeds to step S406.

In step S406, the CPU 201 in the device management apparatus 110 determines whether there is unsorted incident data among the acquired incident data.

If there is unsorted incident data (YES in step S406), the process proceeds to step S407.

In step S407, the CPU 201 in the device management apparatus 110 identifies, as the candidate client, the "client information" 301 managed by the device management apparatus 110 which is associated with the "client ID" 502 included in the current incident data. The "client information" 301 is associated with the "client ID" 502 in the client association table (illustrated in FIG. 3). Further, the CPU 201 in the device management apparatus 110 reads the following information as the candidate error information. More specifically, the CPU 201 reads all of the error information corresponding to the "device ID" 602 associated with the above-described candidate client in the device information table (illustrated in FIG. 6) which is not yet associated with the incident data (i.e., the error information in which there is no data stored in the "corresponding incident No." 705). The process then proceeds to step S408.

In step S408, the CPU 201 in the device management apparatus 110 performs matching illustrated in FIG. 4B between the current incident data and the error information (i.e., the candidate error information) read in step S407.

Upon completing the matching process in step S408, the process proceeds to step S409.

In step S409, the CPU 201 in the device management apparatus 110 sorts the incident corresponding to the current incident data to the "client" 601 corresponding to the "device ID" 702 in the error information matched in step S408. The CPU 201 in the device management apparatus 110 then records the client information to which the current incident data has been sorted in the HDD 211 in the device management apparatus 110 sort (e.g., in the form of the table as illustrated in FIG. 9A according to the second exemplary embodiment). The process then returns to step S406.

In step S411 in FIG. 4B, there may be no candidate error information in which the time difference between the "notification date and time" 504 of the current incident data and the "error occurrence date and time" 703 is within a predetermined period. Further, in step S412, there may be no candidate error information in which the "error occurrence date and time" 703 is earlier than the "notification date and time" 504 of the current incident data. In such cases, the current incident data may be classified as "incident data which cannot be sorted", separately from the "unsorted incident data". The CPU 201 in the device management apparatus 110 may notify the "incident data which cannot be sorted" to a person-in-charge of the device management system.

If the CPU 201 in the device management apparatus 110 determines that there is no unsorted incident data (NO in step S406), the process in the flowchart is terminated.

The process for sorting the incident data to the client illustrated in FIGS. 4A and 4B will be described in detail using the incident data illustrated in FIG. 5.

An example of analyzing the incident data of incident No. "1000" will be described below.

The incident data of incident No. "1000" includes the device ID "DevD100" (i.e., Yes in step S401). Further, the incident data of incident NO. "1000" includes the client ID "client 1" that is associated with "client A" and "client B" as illustrated in FIG. 3. "Client A" and "client B" are thus the candidates for sorting the incident. Furthermore, "client A" is associated with the device ID "DevD100" and the device ID "DevD101", and "client B" is associated with the device ID "DevD102" as illustrated in FIG. 6. Moreover, the device ID "DevD100" included in "client A" matches the device ID "DevD100" in incident No. "1000" (i.e., YES in step S402). The incident data having the incident No. "1000" is thus sorted to "client A" in step S403. The error information in which the device ID is "DevD1000" is then read in step S404. The matching process is then performed between the incident data of incident No. "1000" and the read error information in which the device ID is "DevD1000" in step S405. Since the "type" 506 is "error" and the "content" 507 is "jam" in the incident data of incident No. "1000", there is no possibility that the client will notify the incident before the paper jam occurs (i.e., NO in step S410). As a result, the error information in which the "error occurrence date and time 703" is earlier than the "notification date and time" 504 among the error information read in step S404 is matched in step S412. According to the present exemplary embodiment, the incident data of incident No. "1000" is matched with the error information in which the "error No." 701 is "6000". The value "1000" is thus stored in the "corresponding incident No." 705 in the error information in which the "error No." 701 is "6000" in step S413.

An example of analyzing the incident data of incident No. "1001" will be described below.

The incident data of incident No. "1001" does not include the device ID "DevD100" (i.e., NO in step S401). Further, the incident data of incident NO. "1001" includes the client ID "client 1" that is associated with "client A" and "client B" as illustrated in FIG. 3. "Client A" and "client B" are thus the candidates for sorting the incident. Furthermore, "client A" is associated with the device ID "DevD100" and "DevD101", and "client B" is associated with the device ID "DevD102" as illustrated in FIG. 6. All of the error information which includes the device ID "DevD100", "DevD101", or "DevD102", and in which the "corresponding incident No." 705 is blank is then read in step S407. According to the present example, the error information in which the "error No." 701 is "6001" is read. The matching process is performed between the incident data of incident No. "1001" and the read error information in which the "error No." 701 is "6001", and the incident data is matched to the error information in which the "error No." 701 is "6001" in step S408. Since the details of the matching process is similar to the case of the incident data of incident No. "1000", description will be omitted. The incident data of incident No. "1001" is thus sorted to "client B" associated with the device ID "DevD102" corresponding to the error information in which the "error No." 701 is "6001" in step S409.

An example of analyzing the incident data of incident No. "1002" will be described below.

The incident data of incident No. "1002" does not include the device ID "DevD100" (i.e., NO in step S401). Further, the incident data of incident NO. "1002" includes the client ID "client 3" that is associated with "client C" as illustrated in FIG. 3. "Client C" is thus the candidate for sorting the incident. Furthermore, "client C" is associated with the device ID "DevD200" as illustrated in FIG. 6. All of the error information which includes the device ID "DevD200" and in which the "corresponding incident No." 705 is blank is then read in step S407. According to the present example, the error information in which the "error No." 701 is "6002" is read. The matching process is performed between the incident data of incident No. "1002" and the read error information in which the "error No." 701 is "6002" in step S408. Since the "type" 506 is "order", and the "content" 507 is "A4 sheet" in the incident data having the incident No. "1002", there is a possibility that the client will notify the incident before the paper run-out error occurs in the device (i.e., YES in step S410). As a result, the error information in which the "error occurrence date and time 703" and the "notification date and time" 504 are within a predetermined period among the error information read in step S407 is matched in step S412. According to the present example, the incident data having the incident No. "1002" is matched with the error information in which the "error No." 701 is "6002". The value "1002" is thus stored in the "corresponding incident No." 705 in the error information in which the "error No." 701 is "6002" in step S413. The incident data of incident No. "1002" is sorted to "client C" associated with the device ID "DevD200" corresponding to the error information in which the "error No." 701 is "6002" in step S409.

The flowcharts illustrated in FIGS. 4A and 4B are as described above. By performing the above-described process for sorting the incident data to the clients, the device management apparatus 110 can associate the incident data managed in the incident management apparatus 120 with the client information and the error information managed in the device management apparatus 110.

Sorting results of the incident data which are sorted to the client based on the device ID are reliable. However, the sorting results of the incident data which are sorted to the client without being based on the device ID may be unreliable. To solve such a problem, the CPU 201 in the device management apparatus 110 may perform as follows with respect to the incidents that are sorted to the clients without using the device ID. Specifically, the CPU 201 may mask the items to be unpublicized to other clients in terms of security, such as the device install location and the notifying person, and output the report. Further, the sorting result may be notified to the person-in-charge in the device sales company managing the candidate clients, before outputting the report. The person-in-charge may be notified by transmitting the sorting result to a preset e-mail address of the person-in-charge. Furthermore, the CPU 201 in the device management apparatus 110 may similarly notify the person-in-charge in the device sales company managing the candidate clients, of the incident data of which the client to be sorted to has not been identified in the process illustrated in FIGS. 4A and 4B.

As described above, the client to which the incident is to be sorted can be identified using the values such as the error information, even when there is no device ID in the incident data in the case where the management units of the clients in the incident management system and the device management system are different. As a result, the optimal report can be provided to the client.

In other words, the incident data can be sorted to the appropriate client, and the optimal report can be provided to the client, even when the information on the incident data acquired from the incident management system is insufficient.

According to the above-described exemplary embodiment, the device management apparatus 110 communicates with the device 130 and obtains the error occurrence status of the device 130. However, the device management apparatus 110 may obtain the error occurrence status from an external system. Such an example will be described below with reference to FIG. 1B.

Figure 1B:
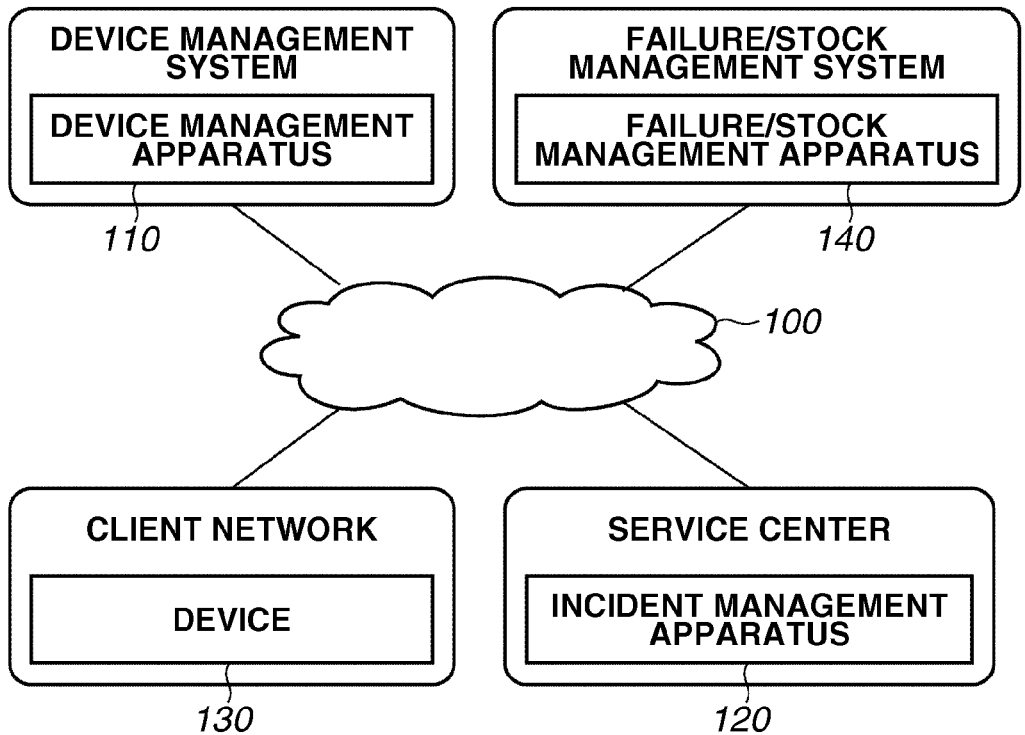

FIG. 1B illustrates a configuration example in a case where the device management apparatus 110 operates in cooperation with a failure/stock management apparatus 140. The components in FIG. 1B which are similar to those illustrated in FIG. 1A are assigned the same reference numbers.

The failure/stock management apparatus 140 configuring a failure/stock management system is a computer configured as illustrated in FIG. 2 similarly as the device management apparatus 110, and is located on the Internet. The failure/stock management system is a separate system from the device management system, and manages the failures in the device 130.

The failure/stock management apparatus 140 includes the functions for managing the error occurrence status of the device 130 and performing stock management of the consumables such as the toner and the sheets. Further, the failure/stock management apparatus 140 includes a web interface for providing the error occurrence status and stock management information managed thereby to the external system.

The device management apparatus 110 obtains from the failure/inventory management apparatus 140 the error occurrence status of the device. The present exemplary embodiment can thus be realized even without directly acquiring the error occurrence status from the device 130.

As described above, the result of sorting the incident data to the client without using the device ID may be unreliable. According to a second exemplary embodiment, such incident data is processed as incident data of which the client is not identifiable. Further, past results of sorting incident data to the clients are used to identify the client. In other words, according to the second exemplary embodiment, the incident data is compared with the past incident data of which the client has been identified. The client identified with respect to the past incident data which is similar to the incident data is identified as the client corresponding to the incident data. The detailed descriptions on the configurations and the procedures similar to those of the first exemplary embodiment will be omitted.

The method for identifying the client of the incident which cannot be sorted to the client using the device ID (i.e., the process for sorting the incident data in which the device cannot be identified) to the client will be described below with reference to FIG. 8.

FIG. 8 is a flowchart illustrating an example of the process for sorting the incident data in which the device cannot be identified to the client according to the second exemplary embodiment. The process illustrated in the flowchart is realized by the CPU 201 in the device management apparatus 110 reading and executing the program recorded to be computer-readable in the HDD 211.

The CPU 201 in the device management apparatus 110 performs the process illustrated in FIG. 8 with respect to each incident data of which the client has not been identified in the process for sorting the incident data to the clients (illustrated in FIGS. 4A and 4B) according to the first exemplary embodiment.

In step S800, the CPU 201 in the device management apparatus 110 identifies, as the client to be the candidate (i.e., the candidate client) for association, "client information" 301 associated with the "client ID" 502 included in the incident data. The "client information" 301 managed by the device management apparatus 110 is associated with the "client ID" 502 in the client association table illustrated in FIG. 3. Further, the CPU 201 in the device management apparatus 110 reads the past incident sorting result records of the candidate client of within a predetermined period illustrated in FIG. 9A, from the HDD 211.

FIG. 9A illustrates an example of the table storing the past incident sorting results.

The CPU 201 in the device management apparatus 110 determines the device corresponding to the incident and sorts the incident to the client. The CPU 201 then stores, in the HDD 211 in the device management apparatus 110, the incident data and the information on the client to which the incident data is sorted in the form of the table as illustrated in FIG. 11A. In other words, the CPU 201 stores the information on the client to which the incident data is sorted in a "sort destination client" 511 of the corresponding incident.

In the example illustrated in FIG. 9A, an incident of which the "incident No." 501 is "999" is sorted to "client A", and incidents of which the "incident No." 501 are "998" and "997" are sorted to "client B". The device management apparatus 110 thus stores the past incident data of which the client has been identified.

The flowchart illustrated in FIG. 8 will be described below.

In step S801, the CPU 201 in the device management apparatus 110 performs control to execute the processes (confirmations) of step S802 and step S803 with respect to all of the past incident sorting result record of the candidate client within a predetermined period.

In step S802, the CPU 201 in the device management apparatus 110 reads the incident sorting result record (i.e., past record) which has not yet been confirmed. The CPU 201 then compares each of the items in the read past record and the incident data to be sorted.

The process will be described below using the incident of which the "incident No." 501 is "1001" illustrated in FIG. 5 as an example.

Since the client ID is "client 1" in the incident No. "1001", "client A" and "client B" managed by the device management system become the candidates for sorting the incident data to. The identification is based on the client association table illustrated in FIG. 3. Incident No. "1001" is thus to be compared to incident No. "999" which is sorted to "client A", and incident No. "998" and "997" which are sorted to "client B" stored in the result table illustrated in FIG. 9A.

The items in the incident data by which the client may be identified, such as the "install location" 508, the "notifying person" 509, and the "service personnel" 510, are compared. Further, if the record to be compared is old, the install location may be changed, so that the record within a predetermined period from the current incident data is compared. If the incident of incident No. "1001" illustrated in FIG. 5 is to be compared with the past records, the past data in which the "install location" 508 matches "office A 3F", the "notifying person" 509 matches "J", or the "service personnel" 510 matches "X" is searched for.

In the result records illustrated in FIG. 9A, the values of "install location" 508 and the "notifying person" 509 in the incident No. "999" match those in incident No. "1001". Further, the value of the "service personnel" 510 in incident No. "998" matches that in incident No. "1001". Furthermore, there are no items in which the values match between incident No. "997" and incident No. "1001".

In step S803, the CPU 201 in the device management apparatus 110 weights (i.e., applies weight to) each item, and calculates a value (i.e., a score) for each matching record.

For example, if the "install location" 508 is the same, it is likely that the client is the same, so that a large weight is set to the item (e.g., the weight is set as "10"). Further, the weight of the "notifying person" 509 is set as "5", and the weight of the "service personnel" 510 which may have a plurality of clients is set as "1". Furthermore, it is less likely for the information on the device in the record of a closer date to be changed from the information in the current incident data. The weighting may thus be changed according to the date of the record.

According to the above-described example, the score of incident No. "999" becomes "10+5=15", the score of incident No. "998" becomes "1", and the score of incident No. "997" becomes "0". Upon completing calculation of the score in step S803, the process returns to step S801.

In step S801, the CPU 201 in the device management apparatus 110 determines whether there is a past record within a predetermined period from the current incident data which has not been confirmed. If there is a past record which has not been confirmed (YES in step S801), the process proceeds to step S802 and then to step S803.

If there is no past record within a predetermined period which has not been confirmed (NO in step S801), the process proceeds to step S804.

In step S804, the CPU 201 in the device management apparatus 110 determines that the incident data is to be sorted to the "sort destination client" 511 in the past record having the highest score calculated in step S803. The CPU 201 thus confirms the sort destination client of the past record with the highest score. According to the above-described example, the CPU determines, as the sort destination client of incident No. "1001", "client A" stored in the "sort destination client" 511 in incident No. "999" based on the value of the score. In other words, the calculated score indicates similarity of the current incident data to the past incident data. The client which has been identified with respect to the past incident data of high similarity is thus determined as the sort destination client.

In step S805, the CPU 201 in the device management apparatus 110 sorts incident No. "1001" to "client A", and stores the incident data and the information on the "sort destination client" 511 in the HDD 211 in the device management apparatus 110. The CPU 201 stores the data and the information in the form of the table as illustrated in FIG. 9A. The process is thus terminated.

As described above, the information in each item included in the incident data is compared with the information in each item in the past incident data. The similarity is then calculated according to the weights applied to the matching items. The client identified with respect to the past incident data of high similarity is thus determined as the sort destination client corresponding to the incident data. As a result, the incident data which cannot be sorted to the client based on the device ID can be sorted to the client based on the past sorting result.

According to a third exemplary embodiment, the client is identified using the past result in a case where the client corresponding to the incident cannot be identified from the incident data, and the "type" 506 of the incident is regularly-performed content.

The detailed descriptions on the components and the procedures similar to those of the first and second exemplary embodiment will be omitted.

The method for identifying the client in a case where the client cannot be identified by performing the method for identifying the client corresponding to the incident using the client ID and the device ID as described according to the first exemplary embodiment will be described below.

The CPU 201 in the device management apparatus 110 reads the past incident sorting result record of the client to be the candidate for sorting the incident from the HDD 211 in the device management apparatus 110.

A case where the incident of which the incident No. 501 is "1004" illustrated in FIG. 5 is to be sorted will be described below. Since the client ID in incident No. "1004" is "client 1", "client A" and "client B" managed by the device management apparatus 110 become the candidate clients, based on the client association table illustrated in FIG. 3.

If the "type" 506 of the incident to be sorted is "regular maintenance", the CPU 201 in the device management apparatus 110 extracts the result record of the candidate clients in which the "type" 506 is "regular maintenance".

FIG. 9B illustrates an example of the table storing the past incident sorting results.

Referring to FIG. 9B, the records in which the "client ID" 502 is the candidate client "client A" or "client B", and the "type" 506 is "regular maintenance" are the incidents of the incident No. "920" and "995".

The "dispatch date and time" 505 in incident No. "920" is "2012/4/15 . . . " and in incident No. "995" is "2012/5/15 . . . ". The CPU 201 in the device management apparatus 110 thus determines that "regular maintenance" is performed once a month with respect to "client A". In other words, the CPU 201 in the device management apparatus 110 estimates an occurrence frequency of the "regular maintenance" with respect to "client A".

Further, there is no incident data of the "regular maintenance" for the month of "June" with respect to "client A" in the result record, and the "dispatch date and time" 505 in incident No. "1004" is "2012/6/15 . . . ". The CPU 201 in the device management apparatus 110 thus therefore determines that the current incident is the "regular maintenance" for the month of "June" with respect to "client A". In other words, the CPU 201 determines that the estimated occurrence frequency and the time information ("dispatch date and time" 505) included in the incident data match.

The CPU 201 in the device management apparatus 110 thus sorts incident No. "1004" to "client A". The CPU 201 then stores, in the HDD 211 in the device management apparatus 110, the incident data and the information on the "sort destination client" 511 in the form of the table illustrated in FIG. 9B.

By performing the above-described process, if the "type" 506 of the incident is "regular maintenance", the incident data which cannot be sorted to the client based on the device ID can be sorted to the client based on the past sorting result.

According to a fourth exemplary embodiment, in a case where the client corresponding to the incident cannot be identified, the client is identified using an error occurrence result for each device.

The detailed descriptions on the components and the procedures similar to those of the first and second exemplary embodiments will be omitted.

The method for identifying the client in the case where the client is not identifiable by the method for identifying the client corresponding to the incident using the client ID and the device ID as described above according to the first exemplary embodiment will be described below.

The CPU 201 in the device management apparatus 110 reads the past incident sorting result record of the client to be the candidate (i.e., the candidate client) for sorting the incident, from the HDD 211 in the device management apparatus 110.

A case where the incident of the incident No. "1005" illustrated in FIG. 5 is to be sorted will be described below.

Since the client ID in incident No. "1005" is "client 1", "client A" and "client B" managed by the device management apparatus 110 become the candidate clients, based on the client association table illustrated in FIG. 3.

The "type" 506 is "error" and the "content" 507 is "jam (occurrence location: J1)" in incident No. "1005".

The CPU 201 in the device management apparatus 110 thus extracts the result record of the candidate client in which the type" 506 is "error" and the "content" 507 is "jam (occurrence location: J1)".

An individual device may be characteristic in that a specific error is likely to occur. In such a case, if the specific error has occurred a predetermined number of times or more in the past in the device, it can be determined that a similar error incident is likely to correspond to the device.

In the example illustrated in FIG. 9B, the "client ID" 502 is "client A" or "client B", i.e., the candidate clients, the type" 506 is "error", and the "content" 507 is "jam (occurrence location: J1)" in the incidents in which the "incident No." 501 are "993" and "994". The "device ID" 503 in both incidents is "DeVD100".

As a result, the CPU 201 in the device management apparatus 110 determines that it is likely that the device corresponding to incident No. "1005" is "DevD100". The CPU 201 thus sorts incident No. "1005" to "client A". Further, the CPU 201 stores the incident data and the information on the "sort destination client" 511 in the HDD 211 in the device management apparatus 110, in the form of the table illustrated in FIG. 9B.

As described above, the past incident data including the same failure information as the failure information included in the incident data is extracted. The device of which the occurrence frequency of the same failure is high is then identified from the device ID of the device included in the extracted past incident data. Further, the client in which the identified device is installed is identified as the client corresponding to the incident data. As a result, if the "type" 506 of the incident is "error", the incident data can be sorted to the client based on the past sorting result, even when the incident data cannot be sorted to the client using the device ID.

By the above-described process, the incident can be sorted to the appropriate client, and the optimal report can be provided to the client, even when the information on the incident data acquired from the incident management system is insufficient.

In other words, the client to which the incident is to be sorted can be identified even when the management units of the clients in the incident management system and the device management system are different and there is no device ID in the incident data. Further, the optimal report can be provided to the client.

According to the above-described exemplary embodiments, the image forming apparatus is described as the device. However, it is not limited thereto, and the device may be an information processing apparatus such as a personal computer or other electronic devices.

The above-described configuration and the contents of the various data are not limited thereto, and various configurations and contents may be employed according to use and objective.

Further, all of the configurations in which each of the above-described exemplary embodiments are combined are included in the present invention.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-226533 filed Oct. 12, 2012, which is hereby incorporated by reference herein in its entirety.

What is claimed is:

1. A device management system comprising at least a processor, functioning as:
   a management unit configured to store and manage first client information on a client and a device installed in a client network of the client;
   an acquisition unit configured to acquire incident data from an incident management system which is in accordance with second client information different from the first client information;
   an identification unit configured to identify, in a case where identification information of a target device is included in the incident data acquired by the acquisition unit, a client corresponding to the incident data from the first client information based on the identification information; and
   a generation unit configured to generate a report using the first client information and the incident data of which the identification unit has identified the client,
   wherein the identification unit identifies, in a case where identification information of a target device is not included in the incident data, a client corresponding to the incident data from the first client information based on failure information of the device installed in the client network.

2. The device management system according to claim 1, wherein the failure information is acquired from a different system which manages failures in the device.

3. The device management system according to claim 1, wherein the identification unit compares the incident data with the failure information, extracts failure information matching a comparison condition, and identifies, as a client corresponding to the incident data, a client of a client network in which the device corresponding to the extracted failure information is installed.

4. The device management system according to claim 3, wherein the identification unit compares time information included in the incident data with time information included in the failure information using the comparison condition according to contents of the incident data.

5. The device management system according to claim 1, wherein the identification unit compares, in a case where the incident data does not include identification information of the target device, the incident data with past incident data of which a client has been identified, and identifies, as a client corresponding to the incident data, a client identified with respect to past incident data similar to the incident data.

6. The device management system according to claim 5, wherein the identification unit compares information on each item included in the incident data with information on a corresponding item included in the past incident data, calculates similarity according to weighting applied to items that have matched, and identifies, as a client corresponding to the incident data, a client identified with respect to the past incident data in which the similarity is high.

7. The device management system according to claim 5, wherein the identification unit extracts, in a case where the incident data indicates content which regularly occurs, past incident data indicating the content which regularly occurs, estimates from time information included in the extracted past incident data and information on an identified client, occurrence frequency of the content which regularly occurs with respect to a specific client, and identifies, in a case where the estimated occurrence frequency and the time information included in the incident data match, the specific client as a client corresponding to the incident data.

8. The device management system according to claim 5, wherein the identification unit extracts past incident data which includes same failure information as failure information included in the incident data, identifies, from identification information of the target device included in the extracted past incident data, a device in which occurrence frequency of the same failure is high, and identifies a client in which the identified device is installed as a client corresponding to the incident data.

9. The device management system according to claim 1, wherein the incident data is data in which, in a case where the device is in a state of being unable to be used in an original level of quality during a period the device can be used, information on the state is recorded.

10. A method performed in a device management system including a management unit configured to store and manage first client information on a client and a device installed in a client network of the client, the method comprising:
   acquiring incident data from an incident management system which is in accordance with second client information different from the first client information;
   identifying, in a case where identification information of a target device is included in the incident data acquired, a client corresponding to the incident data from the first client information based on the identification information; and
   generating a report using the first client information and the incident data which has identified the client,
   wherein in a case where identification information of a target device is not included in the incident data, identifying a client corresponding to the incident data from the first client information based on failure information of the device installed in the client network.

11. The method according to claim 10, wherein the failure information is acquired from a different system which manages failures in the device.

12. The method according to claim 10, wherein the incident data is compared with the failure information, failure information matching a comparison condition is extracted, and a client of a client network in which a device corresponding to the extracted failure information is installed is identified as the client corresponding to the incident data.

13. The method according to claim 12, wherein the failure information is extracted by comparing time information included in the incident data with time information included in the failure information using a comparison condition according to contents of the incident data.

14. The method according to claim 10, wherein, in a case where the incident data does not include identification information of a target device, the incident data is compared with past incident data of which a client has been identified, and the client identified with respect to the past incident data similar to the incident data is identified as the client corresponding to the incident data.

15. The method according to claim 10, wherein the incident data is data in which, in a case where the device is in a state of being unable to be used in an original level of quality during a period the device can be used, information on the state is recorded.

16. The method according to claim 10, further comprising generating a report using the first client information and the incident data of which the client has been identified.

* * * * *